United States Patent [19]
Regehr

[11] 3,953,183
[45] Apr. 27, 1976

[54] APPARATUS FOR SEPARATING MATERIAL PARTICLES FROM GASES

[76] Inventor: Ulrich Regehr, Susterfeld 65, 51-Aachen, Germany

[22] Filed: Sept. 25, 1973

[21] Appl. No.: 400,663

[30] Foreign Application Priority Data
Oct. 3, 1972  Japan.............................. 47-99366

[52] U.S. Cl. ............................................... 55/440
[51] Int. Cl.² ........................................ B01D 45/08
[58] Field of Search............................. 55/440, 392

[56] References Cited
UNITED STATES PATENTS

| | | | |
|---|---|---|---|
| 3,338,035 | 8/1967 | Dinkelacker.......................... | 55/440 |
| 3,358,580 | 12/1967 | Freese et al. ......................... | 55/440 |
| 3,517,486 | 6/1970 | Golden ................................ | 55/440 |
| 3,849,095 | 11/1974 | Regehr.................................. | 55/440 |
| 3,870,488 | 3/1975 | Arndt et al. .......................... | 55/440 |

FOREIGN PATENTS OR APPLICATIONS

| | | | |
|---|---|---|---|
| 849,348 | 11/1952 | Germany .............................. | 55/392 |
| 828,547 | 12/1969 | Canada................................. | 55/440 |

*Primary Examiner*—Bernard Nozick
*Attorney, Agent, or Firm*—Otto John Munz

[57] ABSTRACT

An apparatus for separating particles from a gas flow is provided, comprising: is provided on the concave side of each crest, the serrations winning a plurality of corrugated separator plates arranged in spaced parallel relation to each other and defining wave-like flow channels between each other. The warped surfaces of the separator plates are generated in cross-section by at least three circular arcs connected continuously and with alternating directions of curvature. The radius of each of the three circular arcs is different, the radius of the arc representing the crest being the smallest. The arcs define at least one crest between two troughs, forming an intake section and an outlet-section, respectively of each separator plate. A first separating chamber is provided opening towards the gas flow on the convex side of the crest and is formed by a blade projecting from the downstream side of the crest toward its upstream side and running along the crest. A plurality of serrations running along underneath the crests arranged opposite to the separating chambers of the crest of the adjacent separator plate.

The smaller radius of the second arc and the serrations together with the separating chamber provide a narrowing of the duct toward the crest to increase the speed of the fluid flow. A collision occurs between the main upstream gas flow and a continuous gas flow recoil from the first separating chamber, causing a stationary micro-turbulence in the vicinity of the serrations without a significant loss of energy and speed, whereby even the smallest particles are separated by the serrations.

Two additional separating chambers of specific cross-sections are provided strategically on the downstream past the crest, each retaining material particles not caught previously.

11 Claims, 4 Drawing Figures

APPARATUS FOR SEPARATING MATERIAL PARTICLES FROM GASES

CROSS REFERENCE TO RELATED APPLICATIONS

This applications is a continuation-in-part of inventor's copending application Ser. No. 292,255, now U.S. Pat. No. 3,849,095, issued Nov. 19, 1974.

FIELD OF THE INVENTION

This invention relates to an apparatus for separating material particles, especially liquid droplets from gases.

THE PRIOR ART

The prior art employs apparatuses for separating fine material particles from gases having a plurality of parallel zigzag or sinously shaped profiles spaced apart in parallel with each other.

Inventor's prior art patents U.S. Pat. No. 3,849,095 of Nov. 19, 1974 and Canadian Pat. No. 828,547 of Dec. 2, 1969 are made of record.

In such apparatuses, the profiles have a collection pocket, opening to the direction of the gas flow or serrations on the downstream side. Therefore the flow pattern itself in distorted, because of the sudden change of direction in the profiles or because of the position of a collection pocket. Thus, a high energy loss is caused by the turbulence of gas flow and difficulty arises in the separation of particles from gas.

SUMMARY OF THE INVENTION

An object of the present invention is to provide an improved apparatus comprising a plurality of waved profiles, a wave of which comprises at least three circular arcs, placed apart in parallel with each other to form gas passages of gas therebetween. A first separation chamber is formed with a tongue-like blade, which is projected on a central convex of each wave against gas flow in the gas passage. A plurality of serrations is formed on the central concave of each wave of said profile. Thereby the material particles are separated from the gas passing through the gas passages.

Another object of this invention is to provide an improved apparatus comprising a plurality of waved profiles, a wave of which consists of at least three circular arcs, placed apart in parallel with each other to form gas passages therebetween. A first separating chamber is formed with a tongue-like blade, which is projected on a central convex of each wave of said profile against gas flow in the gas passage, a plurality of serrations is formed on a central concave of each wave of said profile; a second separating chamber is formed with a ]-shaped thin plate on the convexed side behind said serrations; and a third separating chamber is formed with a projection on the concave side opposite to said second separating chamber; thereby the material particles are separated from the gas passing through the gas passages. Preferred embodiments of the present invention are described with reference to the accompanying drawings, as follows.

DESCRIPTION OF THE PREFERRED EMBODIMENTS

Preferred embodiment 1

Figure 1:
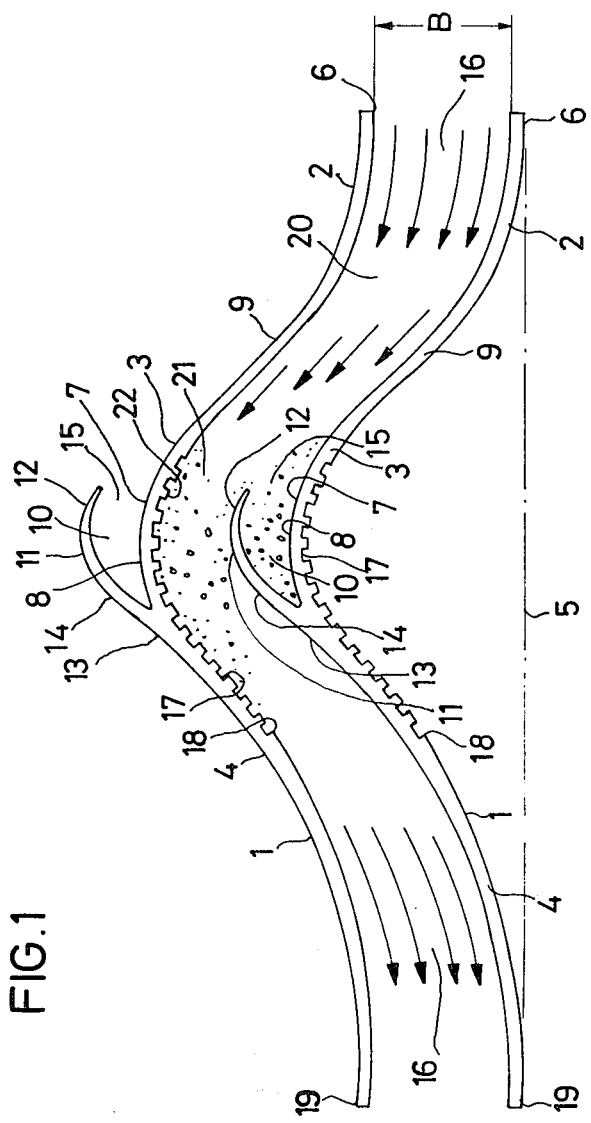
FIG. 1 is a transverse sectional view of a plurality of profiles arranged in parallel and vertical with regard to an embodiment of present invention.
Figure 2:
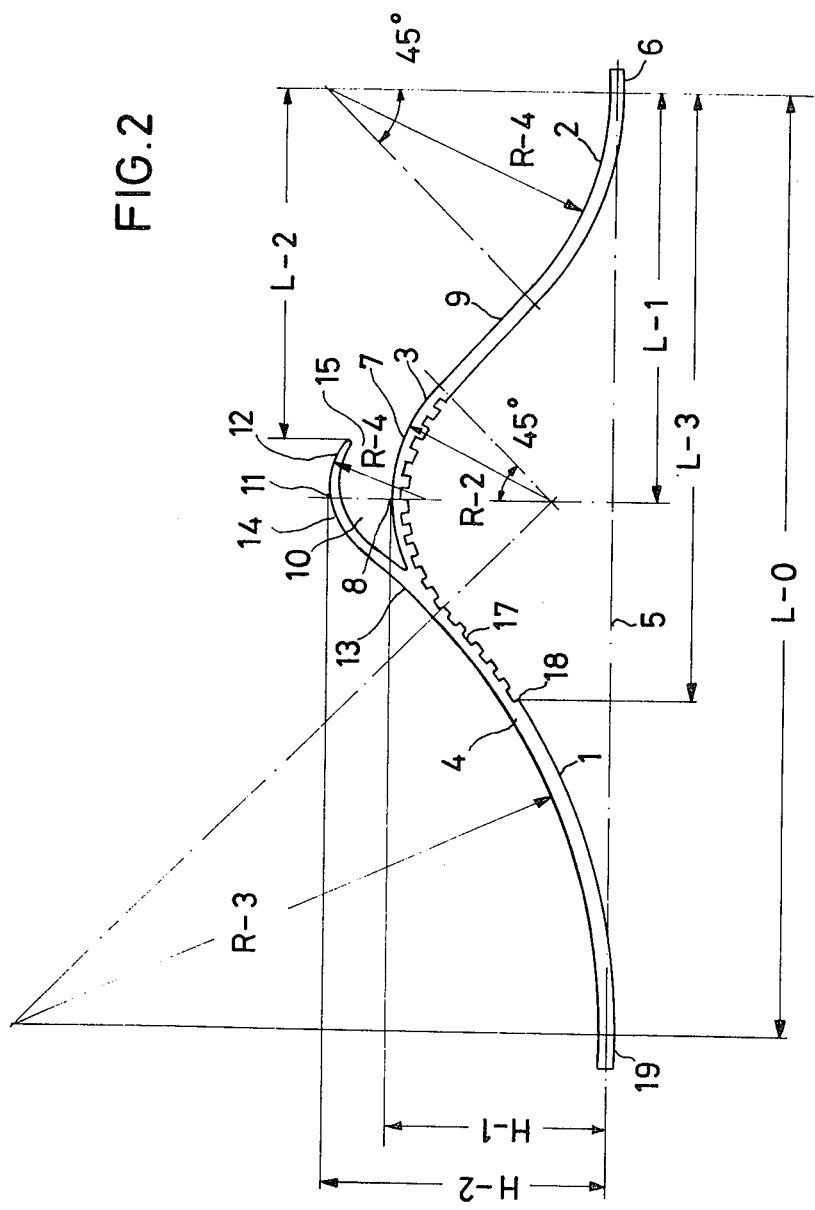
FIG. 2 is a cross-sectional view of the profile in FIG. 1.

A wave profile 1, as shown in FIG. 1 and FIG. 2, is shaped with three circular arcs, a 1st arc 2a, 2nd arc 3, and a 3rd arc 4. With reference to a tangent 5 contacting with the 1st arc 2 and the 3rd arc 4, the parallel component of distance between the centre of the crest of the 2nd arc 3 and the upstream end 6 (contact point on the 1st arc) is L-2. The height of the apex 8 on the circular convex 37 shaped with the 2nd arc (the perpendicular component on the tangent 35) is H-2. The wave-like profile is shaped continuously with the 1st arc 2, a straight line 9 and 2nd arc 3, and the 3rd arc 4. The 1st separating chamber 10 is of semi-circular shape, having a blade 11 combined with a 4th arc 12 and a tangent 13, which contacts the 4th arc 12 and the 2nd arc 3, and a opening 15 at parallel component L-2 of distance from the upstream end 6.

A plurality of serration 17 is provided on the circular concave side opposite to the 1st separating chamber 10, and is extended along the gas duct 16 up to a downstream end 18 of the serrations at parallel component L-3 of distance from the upstream end 6.

Each dimension ratio divided by wave effective length L-0 which is defined by length of the tangent 5 from the upstream end 6 to the downstream end 19, is as follows

| | |
|---|---|
| Radius of 1st arc R-1 | 0.27~0.32 |
| Radius of 2nd arc R-2 | 0.16~0.20 |
| Radius of 3rd arc R-3 | 0.58~0.68 |
| Parallel component of distance from the upstream end 6 to the centre of 2nd arc 3 or 4th arc 12 L-1 | 0.40~0.48 |
| Parallel component of distance from the upstream end 6 to the opening 15 of the 1st separating chamber 10 L-2 | 0.30~0.36 |
| Parallel component of distance from the upstream end 6 to the downstream end 18 of serration L-3 | 0.10~0.12 |

A parallel component for the purposes of this disclosure means a component parallel to the tangent 5.

| | |
|---|---|
| Perpendicular height from the apex 8 of the 2nd arc 3 to the tangent 5 H-1 | 0.22~0.27 |
| Perpendicular height from the apex 11 of the 1st separating chamber 10 to the tangent 5 H-2 | 0.27~0.33 |

The serrations 47 are spaced 1~3 mm apart, 0.1~1 mm deep and 1~3 mm wide. The plurality of profiles 1 are arranged in vertical and parallel and spaced apart at a distance B, of which dimension ratio divided by the wave effective length L-0 is 0.1~0.2.

The cross-sectional area of the gas duct 16 defined between the profiles 1 is minimum at throat 21 formed between the inside of the 2nd arc 3 and the outside of blade 14, and continuously enlarged in direction to upstream or downstream. The gas entraining a lot of particles, such as liquid droplet, is driven into a plurality of vertical and parallel profiles, and then deflected in direction to the throat 21. However the particles are moved straight by inertia force, a part of the particles are separated into the 1st separating chamber 10. In the next step, the gas stream is deflected again, at the throat 21, and the particles are moved to the radial direction by centrifugal force, and impinged to concave 22, of the profile 1 and catched in the serrations 17 without reentrainment by gas stream. The particles, such as liquid droplet, then flow down along the serrations 17. Thus, the apparatus of this invention has a large separation efficiency.

The performances of the apparatus of this invention in comparison with those of prior art are as follows

|  | Apparatus of this invention | Apparatus of prior art |
|---|---|---|
| recommended velocity (m/s) | 8~10 | 2~3 |
| pressure drop at recommended velocity (mmAq) | 13~20 | 10~18 |
| limit particle size at recommended velocity ($\mu$) | 10~12 | 50~60 |
| limit velocity (m/s) | 15 | 3.5 |

A limit velocity means for the purposes of this disclosure a maximum velocity without reentrainment of particles. Therefore, the apparatus of this invention make it possible under the same pressure drop to have ⅓~¼ times smaller gas flow area in comparison with the prior art.

In conclusion, a combined use of the 1st separating chamber as well as the serrations on the concave side of the 2nd arc makes it possible to get an improved separation efficiency, in comparison with the prior single use of only a simple separating chamber.

Preferred embodiment 2

Figure 3:
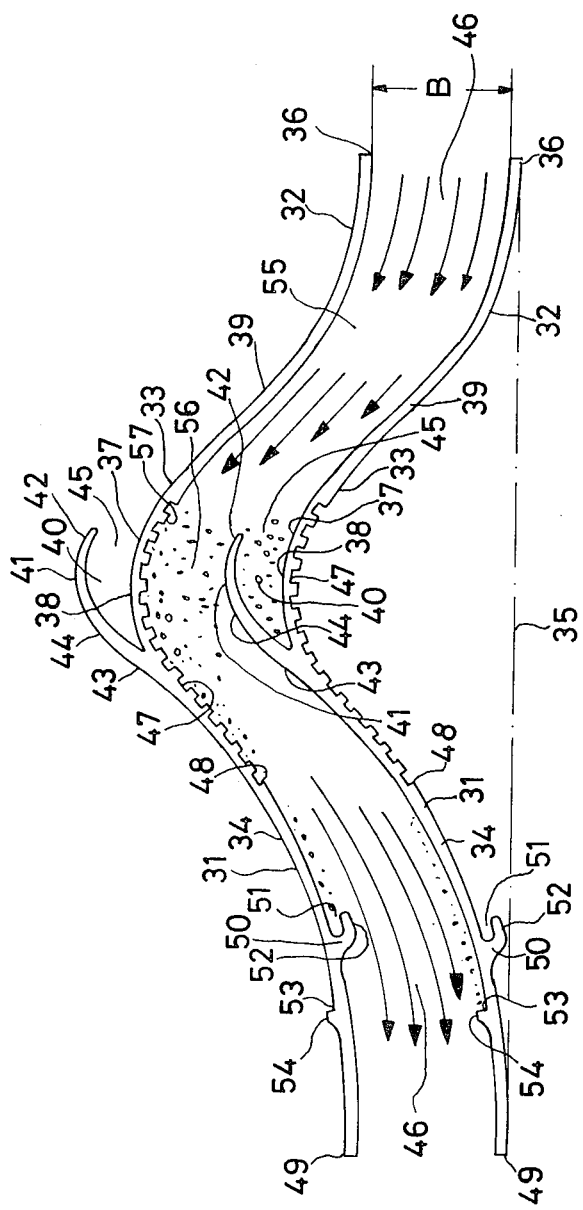
FIG. 3 is a transverse sectional view of a plurality of profiles arranged in parallel and vertical with regard to another embodiment of the present invention.
Figure 4:
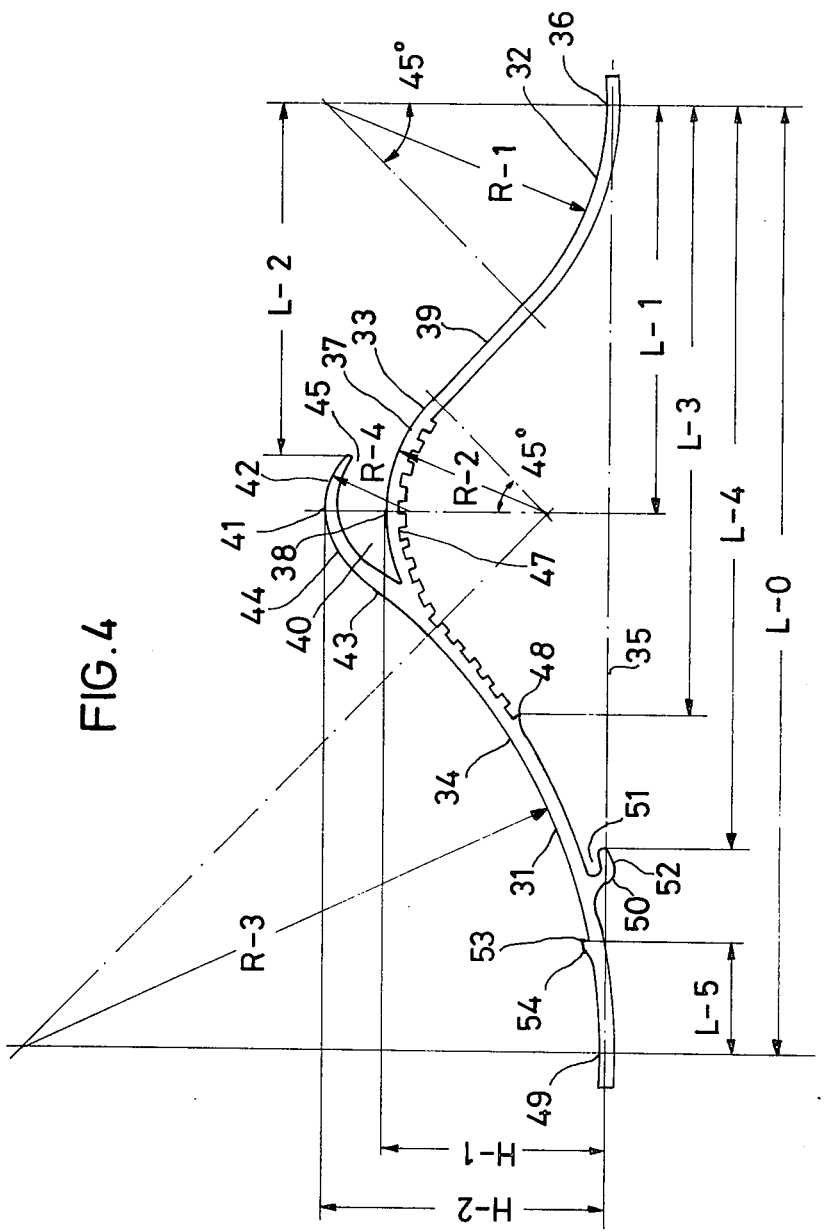
FIG. 4 is a cross-sectional view of the profile in FIG. 3.

A wave-like profile 31, as shown in FIG. 3 and FIG. 4, is shaped with three circular arcs, ie 1st arc 32, 2nd arc 33, and 3rd arc 34. With reference to a tangent 35 contacting with the 1st arc 32, and the 3rd arc 34, the parallel component of distance between the centre of the 2nd arc 33 and the upstream end 36 (contact point on the 1st arc 32) is L-1, the height of apex 38 on the circular convex 37 shaped with the 2nd arc (the perpendicular component on the tangent 35) is H-1. The waved profile is shaped continuously with the 1st arc 32, a straight line 39, the 2nd arc 33, and the 3rd arc 34. The 1st separating chamber 40 is of semicircular shape, having a blade 14 combined with the 4th arc and a tangent 43, which contacts the 4th arc 42 and the 2nd arc 33, and an opening 45 at parallel component L-2 of distance from the upstream end 36.

A plurality of serration 47 is provided on the circular concave side opposite to the 1st separating chamber 40, and is extended along the gas duct 46 up to a downstream end 48 of the serrations at parallel component L-3 of distance from the upstream end 36. Further, the 2nd separating chamber 50 is formed in ]-shape by a thin plate 52 provided on the downstream portion of the concave of the second arc behind the serration 47, opposite to the 1st separating chamber 40, and has an opening 51 in parallel component L-4 of distance from the upstream end 36.

Furthermore, the 3rd separating chamber 53 is formed by a projection 54 on the same side with the 1st separating chamber in parallel component L-5 of distance from the downstream end 49 (contact point of the 3rd arc 34 and the tangent 35).

Each dimension ratio divided by wave effective length L-0, which is defined by length of the tangent 35 from the upstream end 36 to the downstream end 49, is as follows.

| | |
|---|---|
| Radius of 1st arc R-1 | 0.27~0.32 |
| Radius of 2nd arc R-2 | 0.16~0.20 |
| Radius of 3rd arc R-3 | 0.58~0.68 |
| Radius of 4th arc R-4 | 0.07~0.10 |
| Parallel component of distance from the upstream end 36 to the centre of 2nd arc 33 or 4th arc 42 L-1 | 0.40~0.48 |
| Parallel component of distance from the upstream end 36 to the opening 45 of the 1st separating chamber 40 L-2 | 0.30~0.36 |
| Parallel component of distance from the upstream end 36 to the downstream end 48 of serration L-3 | 0.60~0.68 |
| Parallel component of distance from the upstream end 36 to the opening 51 of the 2nd separating chamber 50 L-4 | 0.75~0.82 |
| Parallel component of distance from the downstream end 36 L-5 | 0.10~0.12 |

Notice
Parallel component means a component is parallel to the tangent 35.

| | |
|---|---|
| Perpendicular height from the apex 38 of the 2nd arc 33 to tangent 35 H-1 | 0.22~0.27 |
| Perpendicular height from the apex 41 of the 1st separating chamber 40 to tangent 35 H-2 | 0.27~0.33 |

The 2nd separating chamber 50 is formed in 2~5 mm with regard to the rectangular outside. The projection 54 of the 3rd separating chamber is 1~3 mm high and 0.2~3 mm wide.

The serrations 47 are spaced 1~3 mm apart, 0.1~1mm deep and 1~3 mm wide.

The profiles 31 are arranged in vertical and parallel, and spaced part at a distance B, of which dimension ratio divided by the wave effective length L-0 is 0.1~0.2. The cross-sectional area of the gas duct 55 defined between the profiles 31 is minimum at the throat 56 formed between the inside of the 2nd arc 33 and the outside of is blade 44, and continuously enlarged in the direction to upstream or downstream.

The gas entraining a lot of particles, such as liquid droplet, is driven into a plurality of vertical and parallel profiles, and then deflected in the direction to the throat 56. However, the particles are moved straight by force of inertia, and a part of the particles are separated into the 1st separating chamber 40. In the next step, the gas stream is deflected again, at the throat 56 and the particles are moved to the radial direction by centrifugal force, and impinged to concave 57 of the profile 31, and caught in the serrations 47 without reentrainment by gas stream. The particles, such as liquid droplet, then flow down along the serrations 47. Furthermore, when the gas flow passing through the throat 56 is decelerated through the enlarged gas duct, a large part of the residual particles is removed by the 2nd separating chamber 50 and other parts are removed by the 3rd separating chamber 53. Thus, the apparatus of this invention has a large separating efficiency.

The performances of the apparatus of this invention in comparison with those of prior art are as follows.

|  | Apparatus of this invention | Apparatus of prior art |
|---|---|---|
| Recommended velocity (m/s) | 8~10 | 2~3 |
| pressure drop at recommended velocity (mmAq) | 13~20 | 10~18 |
| limit particle size at recommended velocity ($\mu$) | 10~12 | 50~60 |
| Limit velocity (m/s) | 15 | 3.5 |

A limit velocity means for purposes of this disclosure the maximum velocity without reentrainment of particles.

Therefore the apparatus of this invention make it possible under the same pressure drop to have ⅓~¼ times smaller gas flow area as well as to separate smaller particles in comparison with the prior art.

In conclusion, a combined use of the 1st, 2nd and 3rd separating chamber as well as the serrations on the concave side of profile make it possible to get an improved separation efficiency, in comparison with the prior single use of only a simple separating chamber.

What is claimed is:

1. A separator of material particles from gases, comprising:
    at least one gas duct with an upstream and a downstream orifice in the direction of flow;
    said gas duct including two surfaces in a parallel alignment of alternatively convexly and concavely shaped walls of continuous waves;
    the wave of each surface comprising at least three circular arcs, a first convex arc, a second concave arc, and a third convex arc, said arcs developed of radiuses of curvatures different from each other and interconnected to curve in opposing directions from each other to form gas passages in said duct of different areas, when measured on the cross-sections perpendicular to said wave surfaces;
    the convex surface of each arc provided with a warped blade forking above its apex in the direction of the first arc into a fourth arc developed on a radius of curvature smaller than that of the second arc and projecting into the gas duct to define there together with the convex apex a first separating chamber open towards the flow of the gas;
    the concave surface of each second arc provided with a plurality of serrations beneath said second arc and projecting into said duct above said blade.

2. A separator as claimed in claim 1, the cross-section of the concave arc of each wave having the smallest of the radii of said three circular arcs.

3. A separator as claimed in claim 1, said at least one gas duct being a plurality of gas ducts in parallel alignments, the convex and concave surfaces of one side of a gas duct forming with their opposite sides the convex and concave surfaces respectively of the adjacent ducts.

4. A separator as claimed in claim 1, said serrations extending from the upstream end of said second arc to the intersection between the second and third arcs, and projecting into said duct at a ratio of between about 0.1 to 1 mm, between about 1–3 mm thick and spaced from each other about 1–3 mm.

5. A separator as claimed in claim 1, wherein at the velocity of the gas entering into said duct between about 8 to 10 m/s, the ratio of the dimensions of:
    the radius of the first arc being between about 0.27 to 0.32;
    the radius of the second arc being between about 0.26 to 0.32;
    the radius of the third arc being between about 0.58 to 0.88;
    the radius of the fourth arc being between about 0.07 to 0.10;
    the distance between the apex of the first arc measured on its tangent to the intersection with the perpendicular projection of the radius of the second arc being between about 0.40 to 0.48.

6. A separator of material particles from gases, as claimed in claim 3,
    said gas duct having a cross-sectional profile narrowed on the upstream portion of said second arc immediately preceding said first separating chamber above it and behind it.

7. A separator as claimed in claim 1, further comprising:
    a second separating chamber formed by a flanged or hooked projection in the upstream end of the convex wall of the third arc and open toward the flow of gas.

8. A separator as claimed in claim 7, further comprising a third separating chamber formed by a flanged projection in the upstream end of the concave wall of the third arc about opposite from the said second separating chamber.

9. A separator of fluid particles, such as liquid droplets, from a stream of gases, comprising:
    at least one gas-duct with an upstream inlet orifice and a downstream outlet orifice;
    said gas-duct defined by two walls of wavy surfaces, alternating as concave surfaces and convex surfaces;
    said walls spaced from each other in a parallel alignment;
    said gas-duct having at least one wavy cross-section developed in a continuous sequence between the upstream inlet- and the downstream outlet-orifices thereof as:
    a first circular arc, having a radius between about 0.27 to 0.32;
    a second circular arc, having a radius between about 0.16 to 0.20;
    a third circular arc, having a radius between about 0.58 to 0.68;
    the said arcs curving in directions opposite from each other into a crest of said second arc surrounded in a continuous conduit connection with the adjacent troughs of said Ist and said IIIrd arcs;
    the said inner concave surface of said IInd arc being provided with a line of serrations beneath said second arc above said blade and extending to the downstream to the intersection between the second and third arcs;
    said serrations being spaced between about 1 to 3 mm from each other and being between about 0.1 to 1 mm high and between about 1 to 3 mm apart;
    the apex of the trough of said first arc defining its upstream beginning and being spaced from the apex of the crest of said second arc a distance between about 0.40 to 0.48, the convex inner surfaces of said IIIrd and IInd arcs forking into an arcuate flange open toward the gas stream and extending over and past the apex of the convex surface of said second arc, as a fourth arc, at a distance between about 0.30 to 0.36 from the upstream end;

said fourth arc having a radius smaller than that of said second arc;

the inner concave surface of the fourth arc defining together with the apex convex area of said second arc a first separating chamber.

10. A separator of material particles from gases, as claimed in claim 9, said serrations being equidistantly spaced and running along the concave side of said crest toward the opposite second arc and its first chamber, the apex of the trough of said first arc being spaced from the downstream end of the inner serrated surface a distance between about 0.10 to 0.12.

11. A separator of material particles from gases, as claimed in claim 9, said serrations being equidistantly spaced and running along the concave side of said crest toward the opposite second arc and its first chamber, the apex of the trough of said first arc being spaced from the downstream end of the inner serrated surface a distance between about 0.60 to 0.68;

the parallel component of the distance between the upstream end to the opening of the second separating chamber being spaced a distance of between about 0.75 to 0.82;

the parallel component of distance from the downstream end being about 0.10 to 0.12;

the perpendicular height H-1 from the apex of the second arc to the tangent being about 0.22 to 0.27;

the perpendicular height H-2 from the apex of the first separating chamber to tangent being about 0.27 to 0.33 and the second separating chamber being between about 2 to 5 mm with regard to the rectangular outside;

the projection of the 3rd separating chamber being about 1 to 3 mm high and 0.2 to 3 mm wide.

* * * * *